US011558218B2

(12) United States Patent
Okumura

(10) Patent No.: US 11,558,218 B2
(45) Date of Patent: Jan. 17, 2023

(54) SEMICONDUCTOR DEVICE AND INFORMATION PROCESSING METHOD

(71) Applicant: RENESAS ELECTRONICS CORPORATION, Tokyo (JP)

(72) Inventor: Tsuyoshi Okumura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/409,468

(22) Filed: May 10, 2019

(65) Prior Publication Data

US 2019/0379556 A1 Dec. 12, 2019

(30) Foreign Application Priority Data

Jun. 6, 2018 (JP) .............................. JP2018-108541

(51) Int. Cl.
| | | |
|---|---|---|
| *H04L 12/24* | (2006.01) | |
| *H04L 41/0803* | (2022.01) | |
| *H04L 12/40* | (2006.01) | |
| *H04L 67/12* | (2022.01) | |
| *H04L 41/00* | (2022.01) | |
| *H04L 12/46* | (2006.01) | |

(Continued)

(52) U.S. Cl.
CPC .... *H04L 12/40091* (2013.01); *B60R 16/0231* (2013.01); *B60W 50/00* (2013.01); *H04L 12/4625* (2013.01); *H04L 41/20* (2013.01); *H04L 67/12* (2013.01); *B60W 2050/0026* (2013.01); *B60W 2050/0052* (2013.01); *H04L 2012/40215* (2013.01); *H04L 2012/40273* (2013.01)

(58) Field of Classification Search
CPC ... H04L 12/40091; H04L 67/12; H04L 41/20; H04L 12/4625; H04L 2012/40215; H04L 2012/40273; H04L 43/028; H04L 12/40169; H04L 2012/40234; H04L 2012/40208; B60W 50/00; B60W 2050/0026; B60W 2050/0052; B60R 16/0231
USPC ....................................................... 709/223
See application file for complete search history.

(56) References Cited

U.S. PATENT DOCUMENTS 8,467,324 B2 * 6/2013 Yousefi ................... B60R 16/03
370/310.2
9,154,324 B2 * 10/2015 Hartwich ............ H04L 63/0227
(Continued)

FOREIGN PATENT DOCUMENTS

| JP | 5888252 B2 * | 3/2016 | ............ H04L 12/28 |
| JP | 2017-091214 A | 5/2017 | |
| JP | 2017-105362 A | 6/2017 | |

*Primary Examiner* — Yves Dalencourt
*Assistant Examiner* — Elizabeth Kassa
(74) *Attorney, Agent, or Firm* — McDermott Will & Emery LLP

(57) ABSTRACT

A semiconductor device capable of performing filter processing while suppressing an increase in processing time is provided. The semiconductor device includes a microcontroller. The microcontroller comprises a CPU, a memory and a CAN-controller. The memory stores software. The CPU executes the software stored in the memory. The CAN controller is configured to add label information to the message information. The CAN routing software stored in the memory implements a filtering function for performing a filter processing for determining whether or not to route the message information by using the label information.

13 Claims, 12 Drawing Sheets

(51) Int. Cl.
*B60W 50/00* (2006.01)
*B60R 16/023* (2006.01)

(56) References Cited

U.S. PATENT DOCUMENTS

| | | | | |
|---|---|---|---|---|
| 2001/0005370 A1* | 6/2001 | Ueno | ............... | H04L 45/502 370/393 |
| 2003/0187996 A1* | 10/2003 | Cardina | ............... | H04L 69/329 709/228 |
| 2006/0256717 A1* | 11/2006 | Caci | ............... | H04L 12/16 370/229 |
| 2009/0216875 A1* | 8/2009 | Shi | ............... | H04L 63/0236 709/224 |
| 2012/0173905 A1* | 7/2012 | Diab | ............... | H04L 12/66 713/320 |
| 2012/0307836 A1* | 12/2012 | Ishigooka | ............... | H04L 12/40006 370/401 |
| 2014/0359178 A1* | 12/2014 | Aue | ............... | G06F 13/4234 710/106 |
| 2015/0020152 A1* | 1/2015 | Litichever | ............... | G06F 21/604 726/1 |
| 2015/0172306 A1* | 6/2015 | Kim | ............... | H04L 12/4625 726/23 |
| 2016/0149934 A1* | 5/2016 | Frank | ............... | H04L 12/40169 726/23 |
| 2017/0072876 A1* | 3/2017 | Rajan | ............... | H04L 45/52 |
| 2017/0093659 A1* | 3/2017 | Elend | ............... | H04L 43/08 |
| 2017/0230285 A1* | 8/2017 | Crabtree | ............... | G06Q 10/0637 |
| 2017/0235698 A1* | 8/2017 | van der Maas | ............... | H04L 63/14 710/106 |
| 2020/0389469 A1* | 12/2020 | Litichever | ............... | H04L 63/1425 |

* cited by examiner

| CAN CHANNEL | RECEPTION RULE TABLE | | | |
|---|---|---|---|---|
| | MESSAGE ID | ID MASK | RECEPTION RULE LABEL | STORAGE DESTINATION BUFFER |
| #1 | $100_H$ | $7FF_H$ | $0100_H$ | TRANSMISSION/RECEPTION BUFFER |
| | $200_H$ | $7FF_H$ | $0101_H$ | TRANSMISSION/RECEPTION BUFFER |
| | $300_H$ | $7FF_H$ | $01FF_H$ | TRANSMISSION/RECEPTION BUFFER |
| | $000_H$ (INAPPROPRIATE) | $000_H$ | $01FF_H$ | RECEPTION BUFFER |
| #2 | MESSAGE ID | ID MASK | RECEPTION RULE LABEL | STORAGE DESTINATION BUFFER |
| | $101_H$ | $7FF_H$ | $0200_H$ | TRANSMISSION/RECEPTION BUFFER |
| | $201_H$ | $7FF_H$ | $0201_H$ | TRANSMISSION/RECEPTION BUFFER |
| | $301_H$ | $7FF_H$ | $02FF_H$ | TRANSMISSION/RECEPTION BUFFER |
| | $000_H$ (INAPPROPRIATE) | $000_H$ | $02FF_H$ | RECEPTION BUFFER |
| ..... | | | | |

| CAN CHANNEL | PAYLOAD FILTER TABLE | | | |
|---|---|---|---|---|
| | START OFFSET | SIZE | EXPECTED VALUE | MASK |
| #1 | 2 | 3 | EE0022 | FF00FF |
| | 0 | 64 | AACC00224482... | FF3300FFFF73... |
| | 10 | 15 | 125B5C321938... | FFFFFFFFFFFF... |
| | START OFFSET | SIZE | EXPECTED VALUE | MASK |
| #2 | 12 | 6 | 12A8CD83D9AA | FFFFFFFFFFFF |
| | 0 | 12 | AACC01C89CD2... | BAFE03DC89D7... |
| | 1 | 2 | ABCC | BBFC |
| ...... | | | | |

132a → (points to START OFFSET "2")
132b → (points to SIZE "64")

SEMICONDUCTOR DEVICE AND INFORMATION PROCESSING METHOD

CROSS-REFERENCE TO RELATED APPLICATIONS

The disclosure of Japanese Patent Application. No. 2018-108541 filed on Jun. 6, 2018 including the specification, drawings and abstract is incorporated herein by reference in its entirety.

BACKGROUND

The present invention relates to a semiconductor device and an information processing method.

Data is transmitted and received between in-vehicle devices such as ECUs (Electronic Control Unit) connected to in-vehicle networks. As a communication standard of the in-vehicle networks, for example, CAN (Controller Area Network) is known. As a standard for specifying the software structure of an in-vehicle device, for example, AUTOSAR (AUTomotive Open System Architecture) is available. In connection with this technique, Japanese unexamined Patent Application publication 2017-091214 and Japanese unexamined Patent Application publication 2017-105362 disclose an apparatus having a software structure in accordance with the AUTOSAR.

SUMMARY

When data is transmitted and received between in-vehicle devices, a filter processing for determining whether or not data is to be transferred (routed) may be performed. If the filtering function is not specified in a standard that defines the software configuration of an in-vehicle device such as AUTOSAR, the filter processing needs to be performed by software (application) incorporated in the application layers. However, in such a configuration, the processing time required for the filter processing may be increased.

Other Problems and novel features will become apparent from the description of this specification and the accompanying drawings.

According to one embodiment, the semiconductor device is a semiconductor device having a storage circuit for storing software, at least one processing circuit for executing the software, and a controller configured to add additional information to message information received from an in-vehicle network, wherein the software implements a filtering function for performing a filter processing for determining whether or not to route the message information output from the controller using the additional information.

According to one embodiment, the semiconductor device includes a storage circuit for storing software, at least one processing circuit for executing the software, and a controller configured to add additional information to message information received from an in-vehicle network, the software includes an application for executing processing independent of a microcontroller configuring the semiconductor device, and basic software for making the application independent of the microcontroller, and the basic software implements a filtering function for performing filter processing for determining whether or not to route the message information output from the controller using the additional information in a network interface provided in a layer abstracting hardware of the semiconductor device for enabling use of a protocol defining the in-vehicle network.

According to one embodiment, the information processing method is an information processing method for adding additional information to message information received from an in-vehicle network, and using the additional information, performing filter processing for determining whether or not to route the message information.

According to the above embodiment, it is possible to provide a semiconductor device and an information processing method capable of performing filter processing while suppressing an increase in processing time.

BRIEF DESCRIPTION OF THE DRAWINGS

FIG. 6 is a diagram illustrating a reception rule table according to the first embodiment.

FIG. 7 is a diagram illustrating a payload filter table according to the first embodiment.

DETAILED DESCRIPTION

Figure 1:
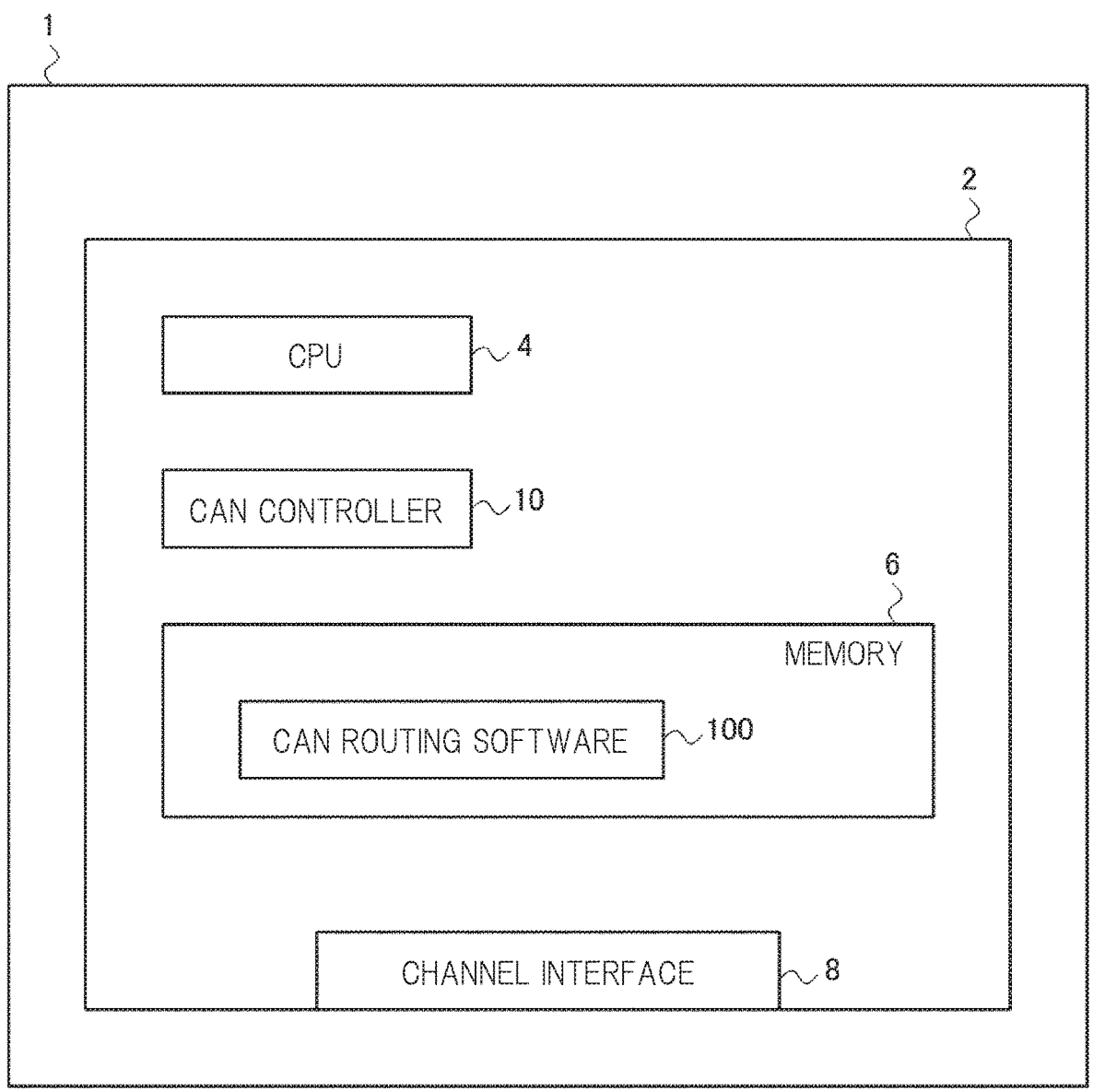
FIG. 1 is a diagram showing a hardware configuration of a semiconductor device according to a first embodiment.

Embodiments will be described below with reference to the drawings. For clarity of explanation, the following description and drawings are appropriately omitted and simplified. In the drawings, the same elements are denoted by the same reference numerals, and a repetitive description thereof is omitted as necessary.

In the following embodiments, when it is necessary for convenience, the description will be made by dividing into a plurality of sections or embodiments, but except for the case where it is specifically specified, they are not independent of each other, and one of them is related to some or all of modifications, applications, detailed description, supplementary description, and the like of the other. In the following embodiments, the number of elements, etc. (including the number of elements, numerical values, quantities, ranges, etc.) is not limited to the specific number, but may be not less than or not more than to the specific number, except for cases where the number is specifically indicated and is clearly limited to the specific number in principle.

Furthermore, in the following embodiments, the constituent elements (including the operation steps and the like) are not necessarily essential except in the case where they are specifically specified and the case where they are considered to be obviously essential in principle. Similarly, in the following embodiments, when referring to the shapes, positional relationships, and the like of components and the like, it is assumed that shapes and the like substantially approximate to or similar to the shapes and the like are included, except for the case in which they are specifically specified and the case in which they are considered not to be so obviously in principle, and the like. The same applies to the above-mentioned numbers and the like, including the number, the numerical value, the amount, the range, and the like.

In addition, the respective elements described in the drawings as functional blocks for performing various processes can be configured by a CPU (Central Processing Unit), a memory, and other circuits in terms of hardware, and are realized by programs loaded in the memory in terms of software. Therefore, it is understood by those skilled in the art that these functional blocks can be realized in various forms by hardware alone, software alone, or a combination thereof, and the present invention is not limited to any of them.

Outline of Embodiment

In an in-vehicle network, communication using the CAN protocol is mainly used for data exchange in a control system. A component having a function of relaying the CAN communication data to each connected device is called a gateway. In response to new technologies such as automatic driving, the number of channels of CAN communication handled by this gateway tends to increase, the amount of communication used tends to increase, and the demand for communication performance becomes more stringent.

On the other hand, as a standard for determining a software configuration for controlling the CAN communication, there is AUTOSAR, and in many cases, software is implemented in a form conforming to the standard of the AUTOSAR. When a function that is not standardized by AUTOSAR is to be realized as a function on gateways, the software needs to be implemented as an application higher than the AUTOSAR software (basic software and RTE described later). Due to the recent increase in security-related demands and the like, filtering functions that are not standardized by AUTOSAR are increasingly required as functions of gateways. However, when implemented as an application, the communication is performed through AUTOSAR software, so that the communication delay becomes large, and it becomes impossible to withstand the stringency of recent communication performance requirements. In such a situation, there is a demand for a technique of performing CAN filter processing at higher speed.

In addition, the microcontroller has a hardware routing function for checking the identifier (ID) of the received CAN message, distributing the message according to whether or not the message is appropriate, and passing the distributed data to the software. The microcontroller has a function of adding a label (additional information) to the data to be transferred to the software at the time of distributing the message. However, according to the AUTOSAR standard, message data conforming to the CAN protocol is processed into a structure differing from a data structure at the time of message reception in a layer higher than the PDUR (PDU (Protocol Data Unit) Router) (see FIG. 2 described later). Therefore, the additional data added to the data by the hardware function of the microcontroller is lost in the component higher than the PDUR. Therefore, it is difficult to improve the efficiency of the software processing.

On the other hand, in the present embodiment, as described below, the CAN filter processing is performed at high speed by using the function of the microcontroller.

First Embodiment

Next, a first embodiment will be described. FIG. 1 is a diagram showing a hardware configuration of a semiconductor device 1 according to the first embodiment. The semiconductor device 1 is an ECU mounted on a vehicle and used for controlling the vehicle. The semiconductor device 1 is connected to an in-vehicle network to which a plurality of in-vehicle devices is connected. The in-vehicle network is based on, for example, CAN, but is not limited thereto. In the example shown in the first embodiment, it is assumed that the in-vehicle network conforms to CAN.

The semiconductor device 1 is, for example, a gateway that transfers CAN communication data transmitted and received by communication using CAN to another in-vehicle device, but the semiconductor device 1 is not limited to a gateway. The semiconductor device 1 includes a microcontroller 2. The microcontroller 2 comprises at least one CPU 4 which is a processor circuit, a memory 6 which is a memory circuit, a channel interface 8 and a CAN-controller 10. The memory 6 stores software. The CPU 4 executes the software stored in the memory 6. The channel interface 8 realizes an interface with a plurality of channels of the CAN.

The CAN controller 10 is a hardware component that executes routing processing for transferring CAN communication data conforming to the CAN protocol to other in-vehicle devices. The CAN controller 10 implements a hardware routing function. Specifically, the CAN controller 10 distributes the message information received from the CAN according to a predetermined reception rule. Here, message information is CAN communication data. Then, the CAN controller 10 performs a filter processing for transferring (routing) the message information by using the identifier (ID) of the message information. Further, the CAN controller 10 is configured to add label information, which is additional information, to the message information. Details will be described later.

The memory 6 stores CAN routing software 100. In the first embodiment, the CAN routing software 100 has a hierarchical software structure to conform to the AUTOSAR standard. It should be noted that the CAN-routing software 100 is not limited to being compliant with the AUTOSAR. The CAN routing software 100 is software for executing a routing process for transferring (relaying) CAN communication data (message information) output from the CAN controller 10 to another in-vehicle device. Here, the CAN routing software 100 implements a filtering function for performing a filter processing for determining whether or not to route the message information by using the label information (additional information). Details will be described later.

Figure 2:
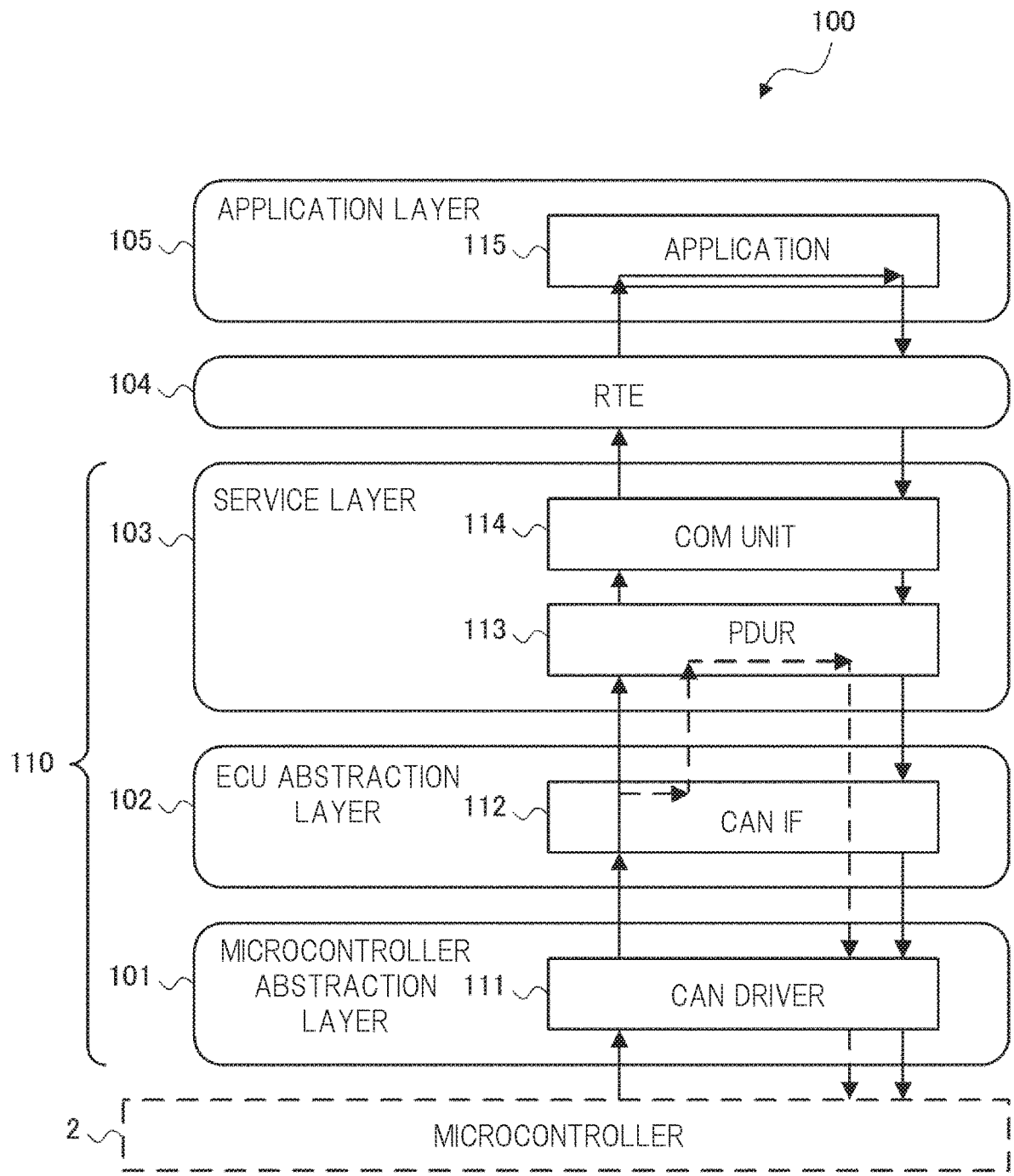
FIG. 2 is a diagram illustrating CAN routing software according to the first embodiment.

FIG. 2 is a diagram showing CAN routing software 100 according to the first embodiment. The CAN-routing software 100 comprises a microcontroller abstraction layer 101, an ECU abstraction layer 102, a services layer 103, an RTE (Runtime Environment) 104, and an application layer 105. Here, at least the microcontroller abstraction layer 101, the ECU abstraction layer 102, and the service layer 103 constitute basic software 110.

The application layer 105 includes an application 115 that executes a process independent of the microcontroller 2. The Basic Software (BSW) 110 processes to make the application 115 be independent of the microcontroller 2.

The microcontroller abstraction layer (MCAL) 101 is an upper layer of the microcontroller 2. The microcontroller abstraction layer 101 abstracts the microcontroller 2. That is, the microcontroller abstraction layer 101 is dependent on the microcontroller 2, but makes its upper layers independent on the microcontroller 2. The microcontroller abstraction layer 101 is a software module that directly accesses a peripheral device incorporated in the microcontroller 2 or an external device mapped to the memory 6. Here, the microcontroller abstraction layer 101 has a CAN driver 111. The CAN driver 111 is a component that handles the CAN protocol.

The ECU abstraction layer 102 is an upper layer of the microcontroller abstraction layer 101. The ECU abstraction layer 102 abstracts hardware components of the semiconductor device 1. That is, although the ECU abstraction layer 102 depends on the hardware of the semiconductor device 1, the upper layer is not dependent on the hardware of the semiconductor device 1. The ECU abstraction layer 102 provides an interface with the microcontroller abstraction layer 101. Here, the ECU abstraction layer 102 includes a CAN interface 112 (CAN IF). The CAN interface 112 is a component serving as a network interface that provides an interface for using the CAN protocol to an upper layer. That is, the CAN interface 112 is a component for enabling a protocol defining a CAN to be used. Here, in the first embodiment, as described later, the CAN interface 112 has a function of performing a filter processing.

The Services Layer 103 is an upper layer of the ECU abstraction layer 102. The service layer 103 includes operating system functions. The service layer 103 provides basic services and basic software modules for the application 115. The service layer 103 includes a PDU router 113 (PDUR) and a communication unit 114 (COM unit). The PDU router 113 has a function of routing a PDU (Protocol Data Unit). The communication unit 114 has a function of providing a data communication function with other in-vehicle equipments to the RTE104.

The RTE (Runtime Environment) 104 is an upper layer of the basic software 110 composed of the above-described layers. The RTE 104 makes the application 115 independent of the semiconductor device 1. The RTE 104 provides communication for the application 115.

Figure 3:
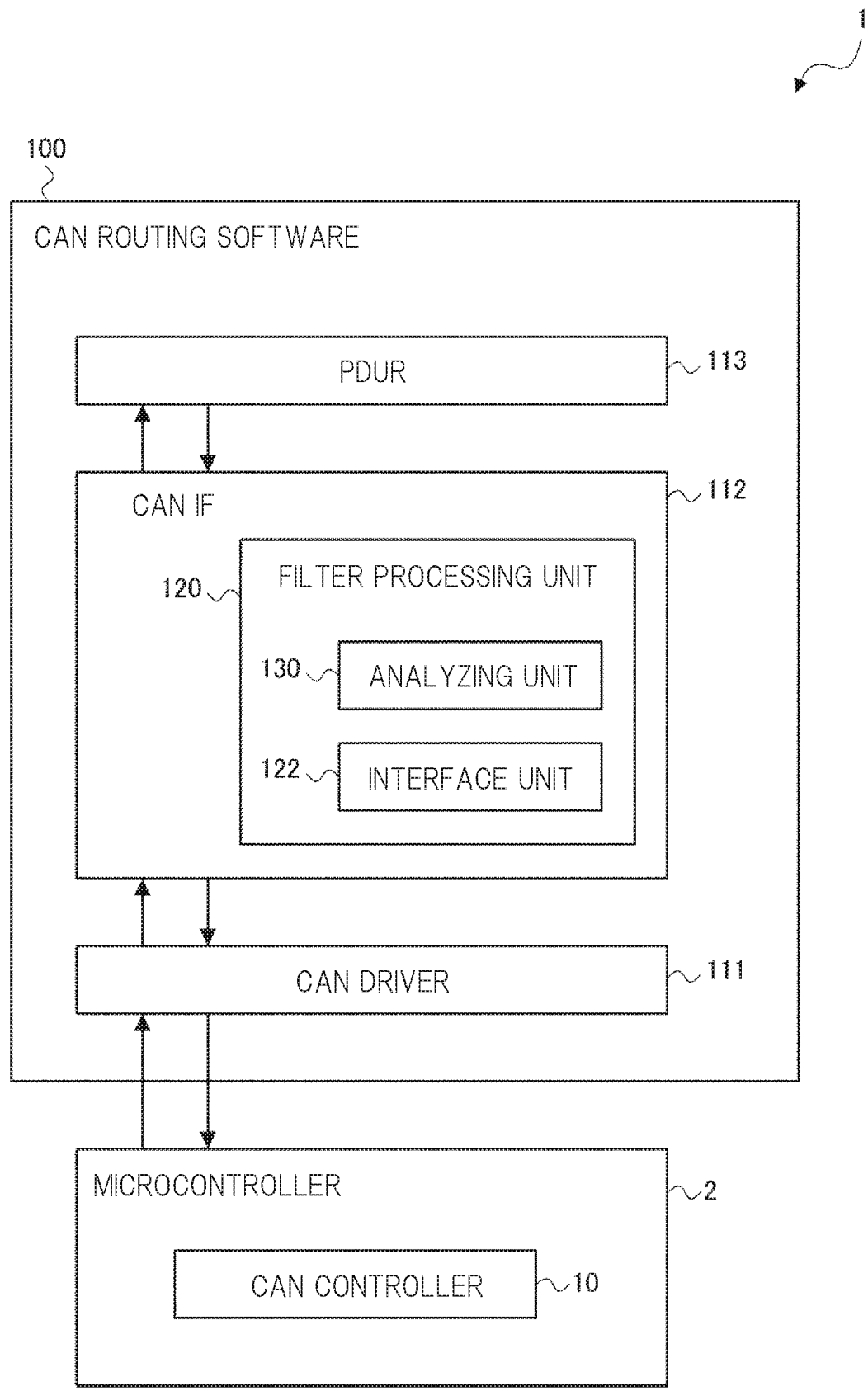
FIG. 3 is a functional block diagram showing a configuration of a semiconductor device according to the first embodiment.

FIG. 3 is a functional block diagram showing a configuration of the semiconductor device 1 according to the first embodiment. As shown in FIG. 3, the semiconductor device 1 includes a microcontroller 2 and CAN routing software 100. In FIG. 3, for convenience, the microcontroller 2 and the CAN routing software 100 are shown separately. However, in practice, as described above, the CAN-routing software 100 is stored in the memory 6 provided in the microcontroller 2 and executed by the CPU 4.

As described above, the CAN routing software 100 includes the CAN driver 111, the CAN interface 112, and the PDU router 113. The CAN interface 112 includes a filter processing unit 120. The filter processing unit 120 performs filter processing for routing message information by using the function of the CAN controller 10. Specifically, the filter processing unit 120 implements a filter processing function for performing filter processing for determining whether or not to route the message information output from the CAN controller 10, using the label information (additional information) added by the CAN controller 10. That is, in the first embodiment, the filtering function is implemented in the CAN interface 112.

The filter processing unit 120 includes an interface unit 122 and an analyzing unit 130. The interface unit 122 has a function providing cooperation between a hardware routing function by the CAN controller 10 and the CAN routing software 100. Specifically, the interface unit 122 extracts the label information added by the CAN controller 10 from the message information received from the CAN controller 10. The analyzing unit 130 analyzes the message information and the label information received from the interface unit 122. Then, the analyzing unit 130 performs a filter processing for determining whether or not to route the message information. Details will be described later.

Figure 4:
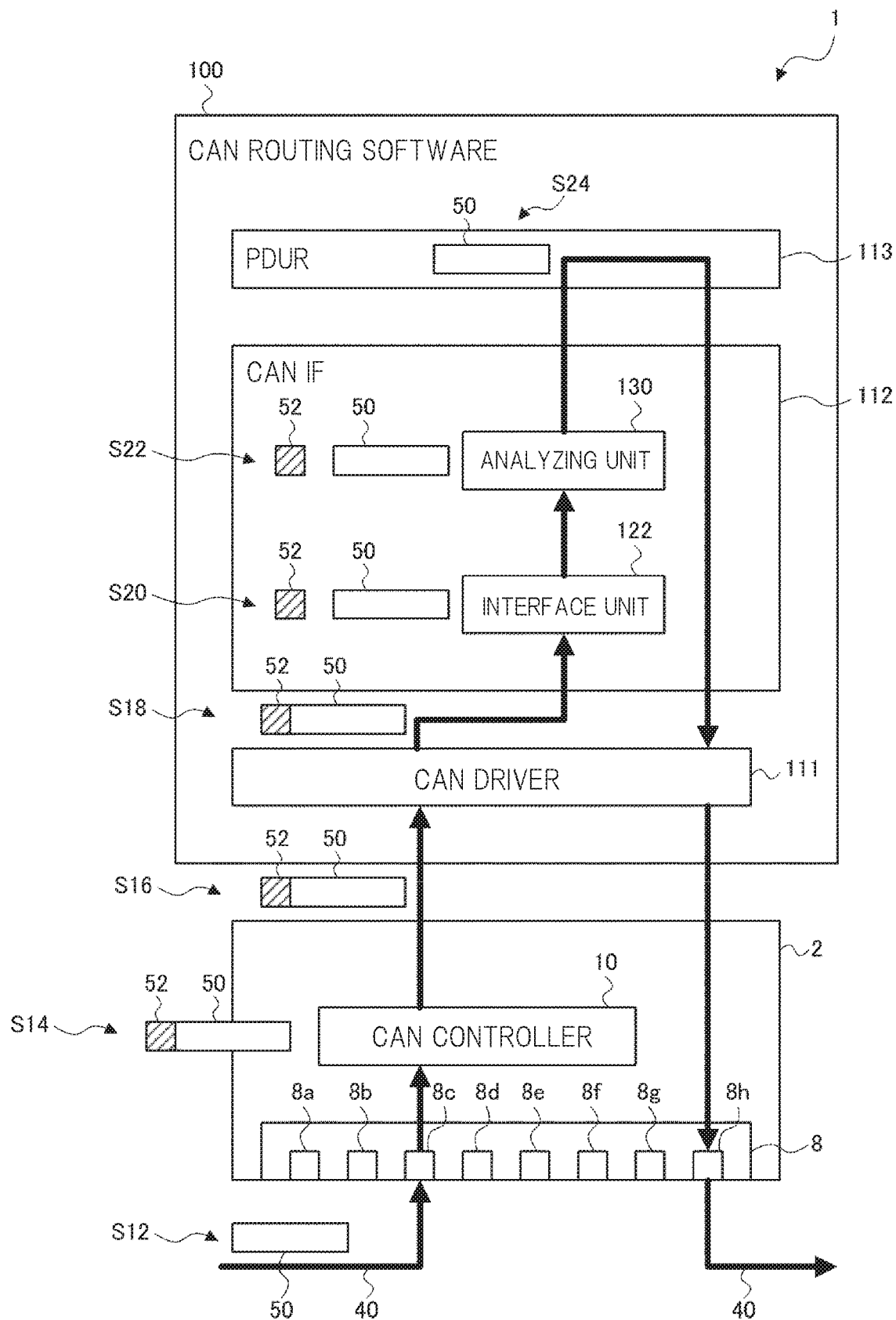
FIG. 4 is a diagram illustrating an outline of a routing process performed by a semiconductor device according to the first embodiment.

FIG. 4 is a diagram showing an outline of routing processing performed by the semiconductor device 1 according to the first embodiment. In step S12, the CAN controller 10 receives the message information 50 via the CAN bus 40 connected to the port 8c of the plurality of ports 8a to 8h of the channel interface 8. In the example shown in FIG. 4, the channel interface 8 has eight ports 8a to 8h, but the number of ports is not limited to eight.

The CAN controller 10 distributes the message information 50 according to whether or not to transmit the message information in accordance with predetermined reception rules. In step S14, the CAN controller 10 adds the label information 52 to the message information 50. The filter processing performed by the CAN controller 10 is, for example, an ID filter processing that uses an identifier (ID) of the message information 50.

In step S16, the CAN controller 10 outputs the message information 50 to which the label information 52 is added to the CAN driver 111 of the CAN routing software 100. In step S18, the CAN driver 111 outputs the message information 50 received from the CAN controller 10 to the interface unit 122 of the CAN interface 112. In step S20, the interface unit 122 extracts the label information 52 from the message information 50. In step S22, the analyzing unit 130 analyses the label information 52 and the message information 50 and performs a filter processing. The filter processing performed by the analyzing unit 130 is, for example, a payload filter processing that uses the payload of the message information 50.

The analyzing unit 130 outputs the message information 50 determined to be transferred by the filter processing to the PDU router 113. In step S24, the PDU router 113 performs routing processing on the message information 50 determined to be transferred. Specifically, the PDU router 113 transmits the message information 50 to the CAN bus 40 via the CAN interface 112, the CAN driver 111, the microcontroller 2, and the port 8h. The CAN bus 40 connected to the port 8h may be different from the CAN bus 40 connected to the port 8c.

Usually, when a function not specified in the AUTOSAR is implemented, the function is implemented as an application 115 in the application layer 105. When processing is performed using the application 115, the data to be processed passes through each layer between the microcontroller 2 and the application layer 105, as indicated by the solid arrow in FIG. 2. Therefore, when filtering for routing is performed in a manner not specified in the AUTOSAR, the processing time may be increased by using the application 115.

On the other hand, in the first embodiment, the CAN interface 112, which is a component lower than the PDU router 113, performs a filter processing for routing. Therefore, routing can be performed in the PDU router 113 as indicated by the broken line arrow in FIG. 2. Therefore, since the number of layers through which data passes is small compared with the case where routing (filtering) is performed by the application 115, it is possible to perform routing at high speed. Details will be described later.

As described above, in the AUTOSAR standard, the layers higher than the PDU router 113 process the message information based on the CAN protocol. Therefore, in this case, when routing (filtering) is performed by the application 115, the label information 52 (additional information) added to the message information 50 by the CAN controller 10 of the microcontroller 2 cannot be used.

On the other hand, in the first embodiment, the filter processing unit 120 is mounted on the CAN interface 112, which is a component lower than the PDU router 113. Therefore, the filter processing unit 120 can handle the message information 50 before being processed in a layer higher than the PDU router 113. Therefore, as described above, the filter processing unit 120 can perform the filter processing using the label information 52. Therefore, the filter processing unit 120 can simplify the processing as compared with the case of performing the routing (filtering) by the application 115, so that the routing can be performed at high speed. Details will be described later.

The semiconductor device 1 according to the first embodiment performs a filter processing on the message information 50 distributed by the CAN controller 10. Therefore, the filtering performed by the CAN controller 10 need not be performed by the CAN routing software 100. Therefore, it is possible to perform routing at high speed as compared with the case where all the filter processing is performed by software. Details will be described later.

When processing other than the filter processing by the CAN routing software 100 according to the present embodiment is performed, the semiconductor device 1 according to the first embodiment can perform the processing using the application 115 as indicated by the solid-line arrow in FIG. 2. Therefore, in the semiconductor device 1 according to the first embodiment, the high-speed filter processing can be achieved while the semiconductor device 1 conforms to the AUTOSAR standard.

Figure 5:
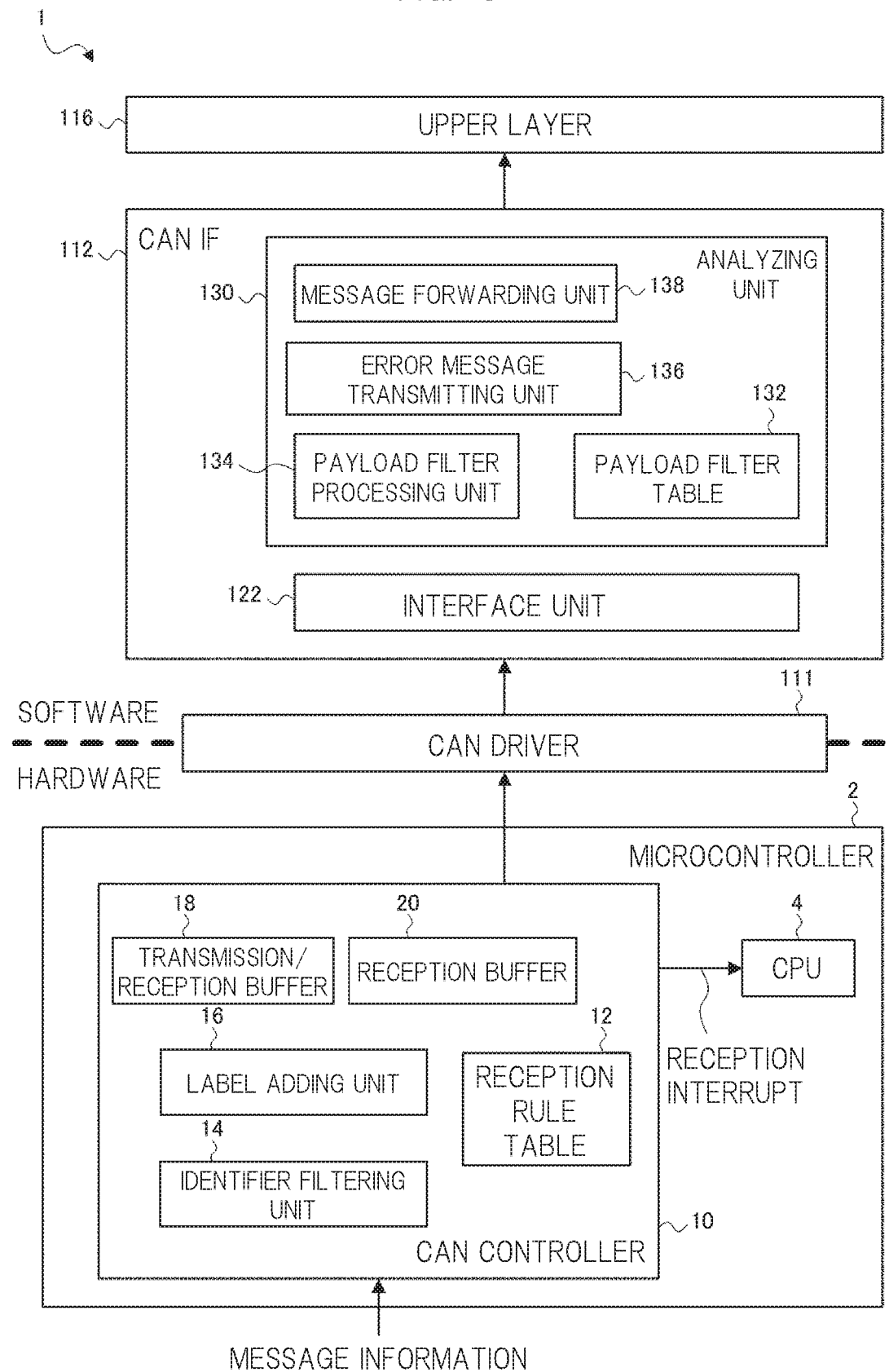
FIG. 5 is a block diagram illustrating a detail of a filter processing function of a semiconductor device according to the first embodiment.

FIG. 5 is a block diagram showing details of the filter processing function of the semiconductor device 1 according to the first embodiment. Semiconductor device 1 comprises a microcontroller 2 that is hardware, a CAN interface 112 that is software, and an upper-layer 116 (PDU router 113, etc.). The CAN driver 111 transmits and receives data to and from hardware.

Upon receipt of the message information 50, the CAN controller 10 outputs (issues) the receive interrupt to the CPU 4. As a result, the CAN routing software 100 is started. The CAN controller 10 includes a reception rule table 12, an identifier filtering unit 14, a label adding unit 16, a transmission/reception buffer 18, and a reception buffer 20. The reception rule table 12 indicates a predetermined reception rule. The reception rule table 12 will be described later with reference to FIG. 6.

The identifier filtering unit 14 performs filtering on the identifier (ID) of the message information 50 using the reception rule table 12. Specifically, the identifier filtering unit 14 determines whether or not the identifier of the message information 50 (message ID) is appropriate using the reception rule table 12. The label adding unit 16 adds label information (additional information) 52 to the message information 50. At this time, the label adding unit 16 adds the label information 52 to the message information 50 using the reception rule table 12. The label adding unit 16 can easily add the label information 52 by using the reception rule table 12.

The transmission/reception buffer 18 and the reception buffer 20 are, for example, FIFO (First-In First Out) buffers. The transmission/reception buffer 18 (a first buffer) is a buffer capable of transmitting and receiving data. The reception buffer 20 (a second buffer) is a buffer that can only receive data. The transmission/reception buffer 18 (the first buffer) may be a buffer at least capable of transmitting data.

The identifier filtering unit 14 distributes the message information 50 using the reception rule table 12. Specifically, the identifier filtering unit 14 stores the message information 50 in the transmission/reception buffer 18 or the reception buffer 20 with using the reception rule table 12. More specifically, the identifier filtering unit 14 stores message information 50 having an appropriate message ID in the transmission/reception buffer 18. On the other hand, the identifier filtering unit 14 stores the message information 50 having an inappropriate message ID in the reception buffer 20.

The analyzing unit 130 of the CAN interface 112 (filter processing unit 120) includes a payload filter table 132, a payload filter processing unit 134, an error message transmitting unit 136, and a message forwarding unit 138. The payload filter table 132 is used for payload filter processing by the payload filter processing unit 134. The payload filter table 132 will be described later with reference to FIG. 7. The functions of the other components will be described later.

FIG. 6 is a diagram exemplifying the reception rule table 12 according to the first embodiment. The reception rule table 12 associates the message ID, an ID mask, a reception rule label (label information 52), and a storage destination buffer information. Each row of the reception rule table 12 is referred to as reception rule information. That is, the reception rule information includes the ID mask corresponding to a certain message ID, the reception rule label, and storage destination buffer information. The reception rule table 12 includes a plurality of pieces of reception rule information for each CAN channel. The identifier filtering unit 14 uses the reception rule table 12 by a method described later.

Here, "H" at the lower right of the value of each item of the reception rule table 12 indicates that the value is a hexadecimal number. In the example of FIG. 6, the message ID and the ID mask are 11-bit data. Therefore, in the "$7FF_H$", all bits of the 11-bit string are "1". The ID of the message information 50 is also 11-bit data. The message ID indicates what information the corresponding message information 50 relates to. For example, "$100_H$" may be the ID of the message information 50 indicating the velocity of the vehicle, and "$200_H$" may be the ID of the message information 50 indicating the residual quantity of fuel in the vehicle. The "$300_H$" may also be the ID of the message data 50 indicating that the brake has been depressed. Note that "$000_H$" in the last row indicates an inappropriate ID (unauthorized ID).

In the example of the CAN channel #1 in FIG. 6, identifiers other than "$100_H$", "$200_H$" and "$300_H$" are set to "$000_H$" by a masking process described later. In the example of the CAN channel #1 of FIG. 6, for example, the message ID "$100_H$" is associated with the ID mask "$7FF_H$", the reception rule label "$0100_H$", and the "transmission/reception buffer". In the example of the CAN channel #1 of FIG. 6, the message ID "$000_H$" is associated with the ID mask "$000_H$", the reception rule label "$01FF_H$", and the "reception buffer".

The upper 8 bits of the reception rule label indicate the CAN channel on which the message information 50 of the corresponding message ID is received. That is, when the upper 8 bits of the reception rule label are "$01_H$", the reception rule label indicates that the message information 50 of the corresponding message ID has been received from the CAN channel #1. When the upper 8 bits of the reception rule label are "$02_H$", the reception rule label indicates that the message information 50 of the corresponding message ID has been received from the CAN channel #2.

FIG. 7 is a diagram illustrating the payload filter table 132 according to the first embodiment. The payload filter table 132 associates "start offset", "size", "expected value", and "mask". The analyzing unit 130 stores a plurality of payload filter tables 132. Preferably, the analyzing unit 130 stores a plurality of payload filter tables 132 corresponding to a plurality of CAN channels, respectively. Each payload filter table 132 is associated with at least a portion of the reception rule label. That is, since the upper 8 bits of the reception rule label indicate the CAN channel, each payload filter table 132 is associated with the upper 8 bits of the reception rule label.

Here, each row of the payload filter table 132 is referred to as payload filter information. The payload filter information is associated with at least a part of the reception rule label. That is, the payload filter information includes a "start offset", "size", "expected value", and "mask" corresponding to at least a portion of a certain reception rule label added to the message information 50.

For example, the payload filter information 132a corresponds to the lower 8 bits "$00_H$" of the reception rule label. The payload filter information 132b corresponds to the lower 8 bits "$01_H$" of the reception rule label. The payload filter processing unit 134 uses the payload filter table 132 by a method described later.

Figure 8:
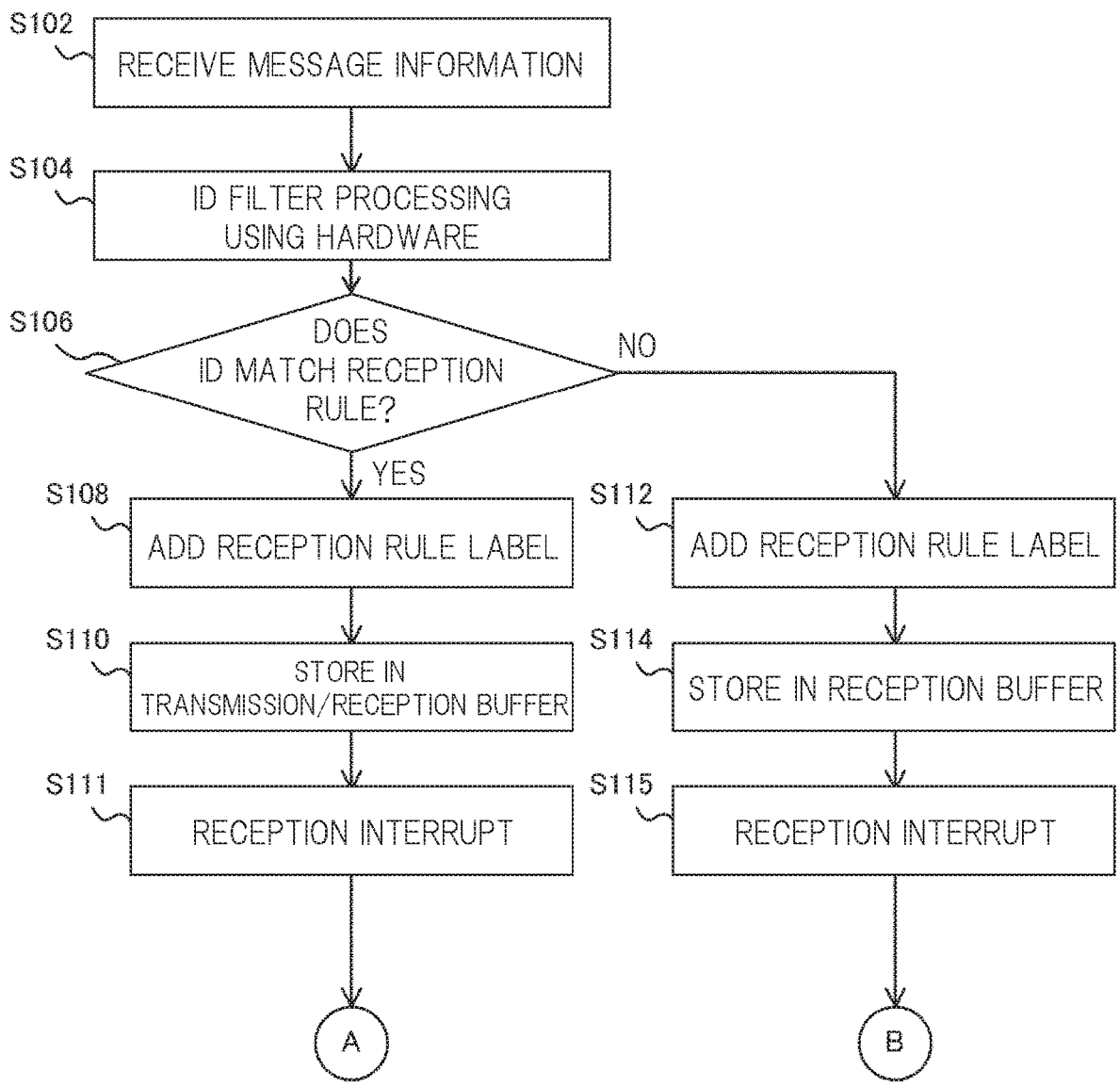
FIG. 8 is a flow chart illustrating an information processing method performed by a semiconductor device according to the first embodiment.
Figure 9:
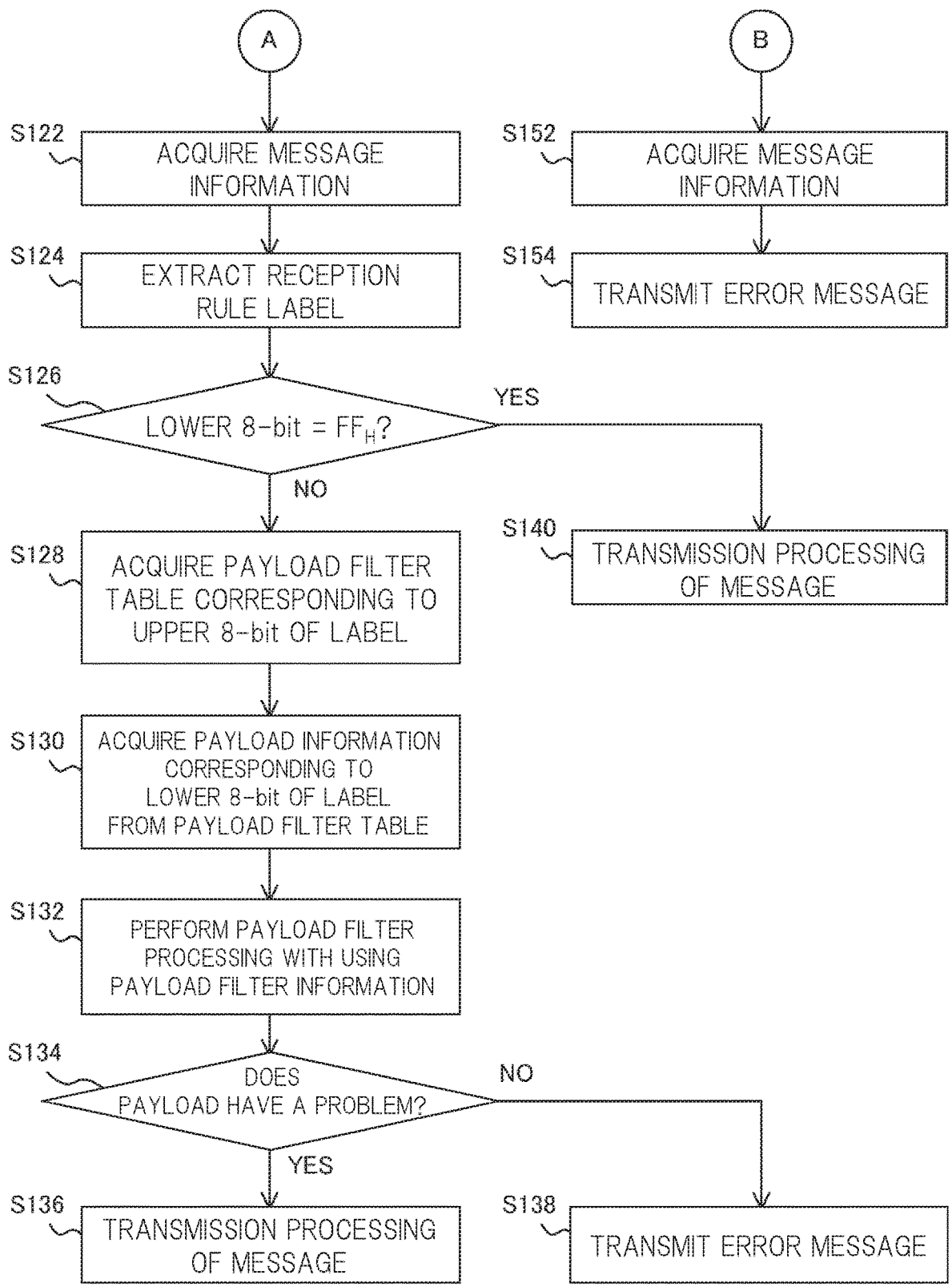
FIG. 9 is a flow chart illustrating an information processing method performed by a semiconductor device according to the first embodiment.

FIG. 8 and FIG. 9 are flowcharts showing an information processing method performed by the semiconductor device 1 according to the first embodiment. In other words, FIG. 8 and FIG. 9 show a filtering method for routing the message information 50. First, in step S102, the CAN controller 10 receives the message information 50.

Next, in step S104, the identifier filtering unit 14 of the CAN controller 10 performs an ID filter processing using hardware on the received message information 50. Specifically, the identifier filtering unit 14 performs filtering on the identifier of the message information 50 using the reception rule table 12. In step S106, the identifier filtering unit 14 determines whether the identifier of the received message information 50 matches the reception rule. In other words, the identifier filtering unit 14 determines whether or not the received message information 50 does not correspond to the last row (message ID "$000_H$") of the reception rule table 12.

If the identifier matches the reception rule (YES in S106), the CAN controller 10 determines that the identifier of the received message information 50 is appropriate. At this time, the label adding unit 16 of the CAN controller 10 adds the corresponding reception rule label (label information 52) to the message information 50 in the reception rule table 12 (step S108). In step S110, the CAN controller 10 stores the message information to which the reception rule label is added in the transmission/reception buffer 18. When the message information 50 is stored in the transmission/reception buffer 18, in step S111, the CAN controller 10 outputs a reception interrupt to the CPU 4 that notifies the completion of the reception of the message information 50.

On the other hand, if the identifier does not match the reception rule (NO in S106), the CAN controller 10 determines that the ID of the received message information 50 is inappropriate. At this time, the label adding unit 16 adds the corresponding reception rule label (label information 52) to the message information 50 in the reception rule table 12 (step S112). In step S114, the CAN controller 10 stores the message information 50 to which the reception rule label is added in the reception buffer 20. In this way, the CAN controller 10 distributes the message information 50 of the appropriate ID to the transmission/reception buffer 18, and distributes the message information 50 of the inappropriate ID to the reception buffer 20. When the message information 50 is stored in the reception buffer 20, in step S115, the CAN controller 10 outputs a reception interrupt to the CPU 4 that notifies the completion of the reception of the message information 50.

In the example shown in FIG. 6, a case where the message information 50 is received from the CAN channel #1 will be described below. When the message information 50 of the identifier "$100_H$" is received, the identifier filtering unit 14 extracts the ID mask "$7FF_H$" from the reception rule table 12. Then, the identifier filtering unit 14 performs a masking process on the identifier "$100_H$" using the ID mask "$7FF_H$". Here, in the present embodiment, the "mask processing" is processing in which the bit at the position corresponding to the bit position of "0" of the ID mask is set to "0" in the bit string to be masked, and the bit at the position corresponding to the bit position of "1" of the ID mask is left as it is.

Therefore, the result of performing the masking process on the identifier "$100_H$" using the ID mask "$7FF_H$" is "$100_H$". Therefore, the identifier filtering unit 14 determines that the identifier "$100_H$" subjected to the masking process using the ID mask "$7FF_H$" matches the message ID "$100_H$" defined in the reception rule table 12. Therefore, in the process of S106, the identifier filtering unit 14 determines that the ID of the received message information 50 matches the reception rule. In S108, the label adding unit 16 adds the reception rule label "$0100_H$" corresponding to the message ID "$100_H$" in the reception rule table 12 to the message information 50. Then, in the process of S110, the CAN controller 10 stores the message information 50 to which the reception rule label "$0100_H$" is added in the transmission/reception buffer 18.

Similarly, when the message information 50 of the identifier "$200_H$" or "$300_H$" is received, the identifier filtering unit 14 performs a masking process for the identifier "$200_H$" or "$300_H$" using the ID mask "$7FF_H$." At this time, the masked result is "$200_H$" or "$300_H$". Therefore, the identifier filtering unit 14 determines that the identifier subjected to the masking process using the ID mask "$7FF_H$" matches the message ID defined in the reception rule table 12. Therefore, in the process of S106, the identifier filtering unit 14 determines that the ID of the received message information 50 matches the reception rule. In S108, the label adding unit 16 adds the reception rule label "$0101_H$" to the message information 50 of the identifier "$200_H$". The label adding unit 16 adds the reception rule label "$01FF_H$" to the message information 50 of the identifier "$300_H$". Then, in the processing of S110, the CAN controller 10 stores the message information 50 to which the reception rule label is added in the transmission/reception buffer 18.

On the other hand, when the message information 50 having the identifier other than "$100_H$", "$200_H$" and "$300_H$" (for example, "$110_H$") is received, the identifier filtering unit 14 extracts the ID mask "$000_H$" from the reception rule table 12. The message IDs defined in the reception rule table 12 are processed in order from the head in the reception rule table 12. Therefore, if the ID of the received message information 50 does not match any of "$100_H$", "$200_H$" and "$300_H$" the reception rule at the end must be met.

Then, the identifier filtering unit 14 performs a masking process on the identifier of the received message information 50 using the ID mask "$000_H$". At this time, the masked result is "$000_H$". Therefore, the identifier filtering unit 14 determines that the identifier subjected to the masking process using the ID mask "000$_H$" matches the message ID "000$_H$" defined in the reception rule table 12. Therefore, in the process of S106, the identifier filtering unit 14 determines that the ID of the received message information 50 does not match the reception rule. In S112, the label adding unit 16 adds the reception rule label "01FF$_H$" corresponding to the message ID "000$_H$" in the reception rule table 12 to the message information 50. Then, in the process of S114, the CAN controller 10 stores the message information 50 to which the reception rule label "01FF$_H$" is added in the reception buffer 20.

As described above, the CAN controller 10 according to the first embodiment distributes the message information 50 with using the reception rule table 12 stored in advance. Therefore, the ID filter processing can be performed at high speed. Further, the CAN controller 10 according to the first embodiment adds a reception rule label to the message information 50 with using the reception rule table 12. Therefore, the reception rule label can be easily added.

When a reception interrupt occurs due to the message information 50 being stored in the transmission/reception buffer 18, the CAN routing software 100 acquires the message information from the transmission/reception buffer 18 in step S122. Specifically, the interface unit 122 acquires the message information 50 from the transmission/reception buffer 18 via the CAN driver 111. In step S124, the interface unit 122 extracts the reception rule label added to the message information 50. The interface unit 122 outputs the extracted reception rule label and the message information 50 to the analyzing unit 130.

In steps S126 to S134, the analyzing unit 130 performs a filter processing by software using the reception rule label. In step S128, the payload filter processing unit 134 of the analyzing unit 130 determines whether or not at least apart of the reception rule label matches predetermined data. Specifically, the payload filter processing unit 134 determines whether or not the lower 8 bits of the reception rule label coincide with "FF$_H$".

When the lower 8 bits of the reception rule label do not coincide with the "FF$_H$" (NO in S126), the payload filter processing unit 134 acquires the payload filter table 132 corresponding to the upper 8 bits which are at least a part of the reception rule label (S128). In step S130, the payload filter processing unit 134 acquires payload filter information corresponding to the lower 8 bits, which are at least apart of the reception rule label, from the payload filter table 132 acquired in step S128.

In step S132, the payload filter processing unit 134 performs payload filter processing with using the payload filter information acquired in step S130. In step S134, the payload filter processing unit 134 determines whether there is any problem in the payload. More specifically, the payload filter processing unit 134 masks a data string of the number of data indicated by "size" from a position offset from the start position of the payload by the number of data indicated by "start offset" with data indicated by "mask". Then, the payload filter processing unit 134 determines that there is no problem in the payload when the masked data value becomes the "expected value". In the payload, the data of the portion to be compared with the expected value is a portion serving as an index for judging the validity of the payload.

When there is no problem in the payload, that is, when the message information 50 is normal (YES in S134), the message forwarding unit 138 outputs the message information 50 to the upper layer 116. As a result, transfer processing is performed by the upper layer 116 (PDU router 113) (step S136). On the other hand, when there is a problem in the payload, that is, when there is an abnormality in the message information 50 (NO in S134), the error message transmitting unit 136 transmits an error message (step S138).

For example, in the example of FIG. 6 and FIG. 7, it is assumed that the message information 50 having the ID "100$_H$" is received in the CAN channel #1. In this case, the reception rule label "0100$_H$" is added to the message information 50. At this time, in the processing of S128, the payload filter processing unit 134 acquires the payload filter table 132 (for example, the table of CAN channel #1 in FIG. 7) corresponding to the upper 8 bits "01$_H$" of the reception rule label "0100$_H$". In the processing of S130, the payload filter processing unit 134 acquires the payload filter information 132a corresponding to the lower 8 bits "00$_H$" of the reception rule label "0100$_H$". In the payload filter information 132a, the "start offset" is 2 bytes and the "size" is 3 bytes. Also, "expected" is "EE0022" and "masks" is "FF00FF".

In the above cases, it is assumed that the payload of the message information 50 is "0011EE3322556677". At this time, in the processing of S132, the payload filter processing unit 134 masks the data "EE3322" for 3 bytes from the position offset by the start offset "2 bytes" from the start position of the payload with "FF00FF". At this time, the result of masking "EE3322" with "FF00FF" is "EE0022" and coincides with the expected value. Therefore, in S134, the payload filter processing unit 134 determines that the payload is normal. In this case, in the process of S136, the message forwarding unit 138 (PDU router 113) performs the transmission processing of the message information 50.

It is also assumed that the payload of the message information 50 is "0011ED3322556677". At this time, in the processing of S132, the payload filter processing unit 134 masks the data "ED3322" for 3 bytes from the position offset by the start offset "2 bytes" from the start position of the payload with "FF00FF". At this time, the result of masking "ED3322" with "FF00FF" is "ED0022" and does not coincide with the expected value. Therefore, in S134, the payload filter processing unit 134 determines that the payload is not normal. In this case, in the process of S138, the error message transmitting unit 136 generates an error message and transmits it to another ECU or the like.

On the other hand, when at least a part of the reception rule label matches the predetermined data, that is, when the lower 8 bits of the reception rule label matches the "FF$_H$" (NO in S126), the message forwarding unit 138 outputs the message data 50 to the upper layer 116. As a result, transfer processing is performed by the upper layer 116 (PDU router 113) (step S140). That is, in this case, the payload filter processing using the payload filter table 132 is not performed.

For example, in the example of FIG. 6, it is assumed that the message information 50 having the ID "300$_H$" is received in the CAN channel #1. In this instance, the reception rule label "01FF$_H$" is added to the message information 50. At this time, in the processing of S126, since the lower 8 bits of the reception rule label are "FF$_H$", the payload filter processing unit 134 does not perform the filter processing (S132) using the payload filter table 132. Then, the message forwarding unit 138 (PDU router 113) performs transfer processing (S140). The reason why the filter processing that uses the payload filter table 132 is unnecessary is that a reception rule label whose lower 8 bits are "FF$_H$" is added to the ID of the message information 50 whose content of the payload does not need to be checked. For example, an event such as "the brake is depressed" may indicate that the event has occurred, and the content of the payload does not matter in the control of the vehicle.

As described above, in step S128, the analyzing unit 130 according to the first embodiment acquires the payload filter table 132 using the upper 8 bits of the reception rule label as an index. Further, in step S130, the analyzing unit 130 according to the first embodiment acquires payload filter information using the lower 8 bits of the reception rule label as an index. As a result, the time required for the search processing of the payload filter information can be greatly reduced as compared with the case where the reception rule label is not used. Therefore, in the first embodiment, the filter processing can be performed while suppressing an increase in the processing time.

As described above, the CAN routing software 100 according to the first embodiment transfers the message information 50 without performing the payload filter processing using the payload filter table 132 when the lower 8 bits of the received rule-label coincide with the $FF_H$. This makes it possible to reduce the processing time.

On the other hand, when a reception interrupt occurs due to the message information 50 being stored in the reception buffer 20, the CAN routing software 100 acquires the message information 50 from the reception buffer 20 in step S152. In this case, in step S154, the error message transmitting unit 136 of the analyzing unit 130 immediately generates an error message and transmits the error message to another ECU.

As described above, by storing the illegal message information 50 in the reception buffer 20, the CAN routing software 100 can immediately determine that the message information 50 is an error. Therefore, it is unnecessary for the CAN routing software 100 to determine the message information 50 having an illegal ID. Therefore, since the CPU 4 resources are suppressed from being consumed, the filter processing can be performed at high speed. In addition, since the CAN routing software 100 is configured to perform filter processing only on the message information 50 stored in the transmission/reception buffer 18, the processing is simplified.

Comparative Example

Figure 10:
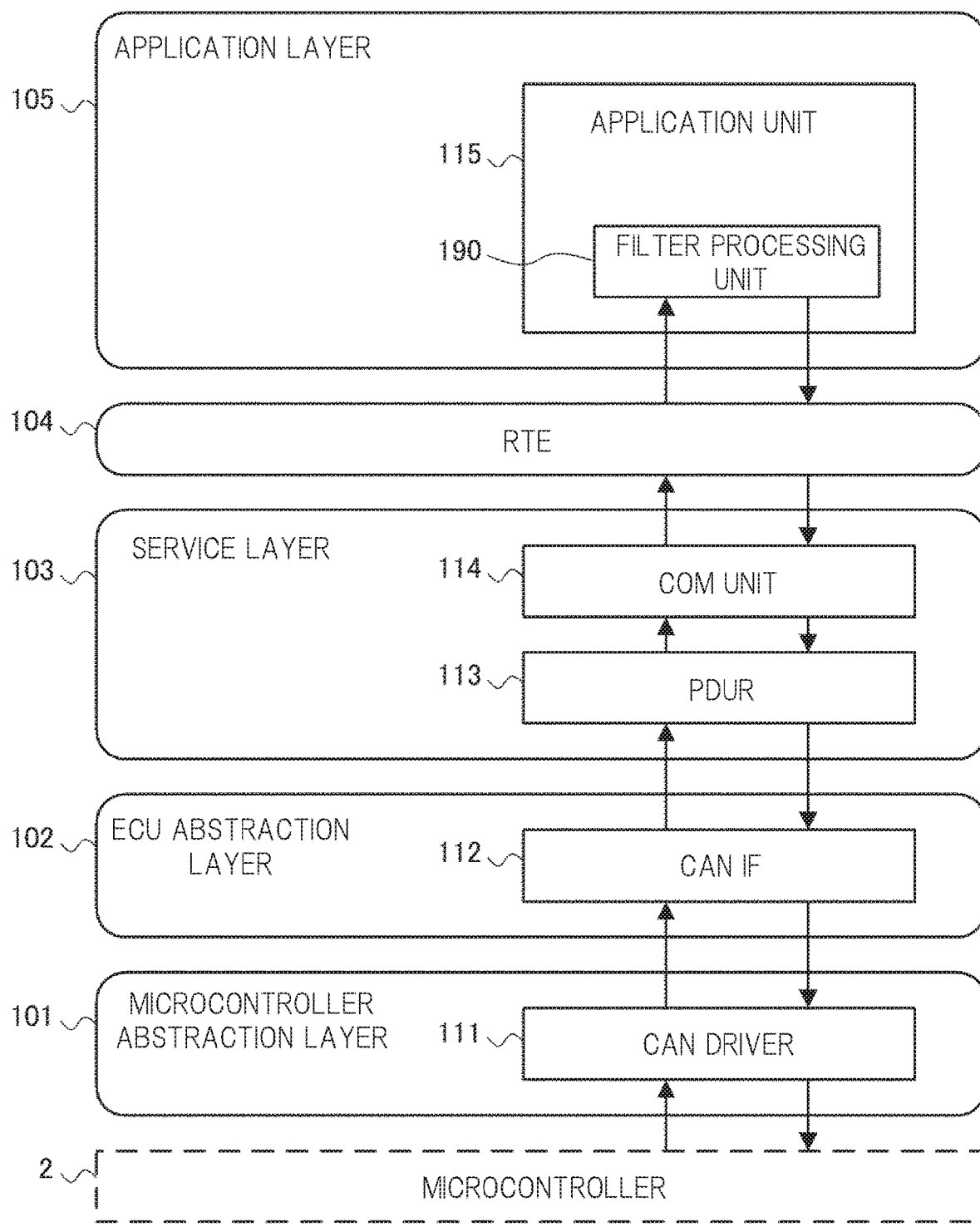
FIG. 10 is a diagram for explaining a first comparative example.

Next, a comparative example with respect to the first embodiment will be described. FIG. 10 is a diagram for explaining a first comparative example. As shown in FIG. 10, in the first comparative example, a filter processing unit 190 is provided in the application 115 of the application layer 105. The filter processing unit 190 may perform the filter processing as described above on the message information 50. As described above, the message information 50 passes through the CAN driver 111, the CAN interface 112, the PDU router 113, the communication unit 114, and the RTE 104. Therefore, in the filter processing according to the first comparative example, the number of layers (components) through which the message information 50 passes is larger than that in the first embodiment. Therefore, the processing time required for the filter processing according to the comparative example may be increased as compared with the first embodiment.

On the other hand, in the first embodiment, the CAN interface 112, which is a component lower than the PDU router 113, performs a filter processing for routing. Therefore, the number of layers through which data passes is smaller than that in the case where routing (filtering) is performed by the filter processing unit 190 of the application 115 of the first comparative example. Therefore, in the first embodiment, routing can be performed at high speed.

As described above, in the first comparative example, the additional information (reception rule label) added by the microcontroller 2 is deleted in the layer higher than the PDU router 113. Therefore, the filter processing unit 190 cannot perform the filter processing using the reception rule label.

On the other hand, in the first embodiment, as described above, the filter processing unit 120 is mounted on the CAN interface 112, which is a component lower than the PDU router 113. Therefore, the filter processing unit 120 can perform the filter processing by using the label information 52, i.e., the reception rule label. Therefore, the filter processing unit 120 according to the first embodiment can simplify the processing as compared with the case where routing (filtering) is performed by the filter processing unit 190 of the application 115. Therefore, in the method according to the first embodiment, routing can be performed at high speed.

Figure 11:
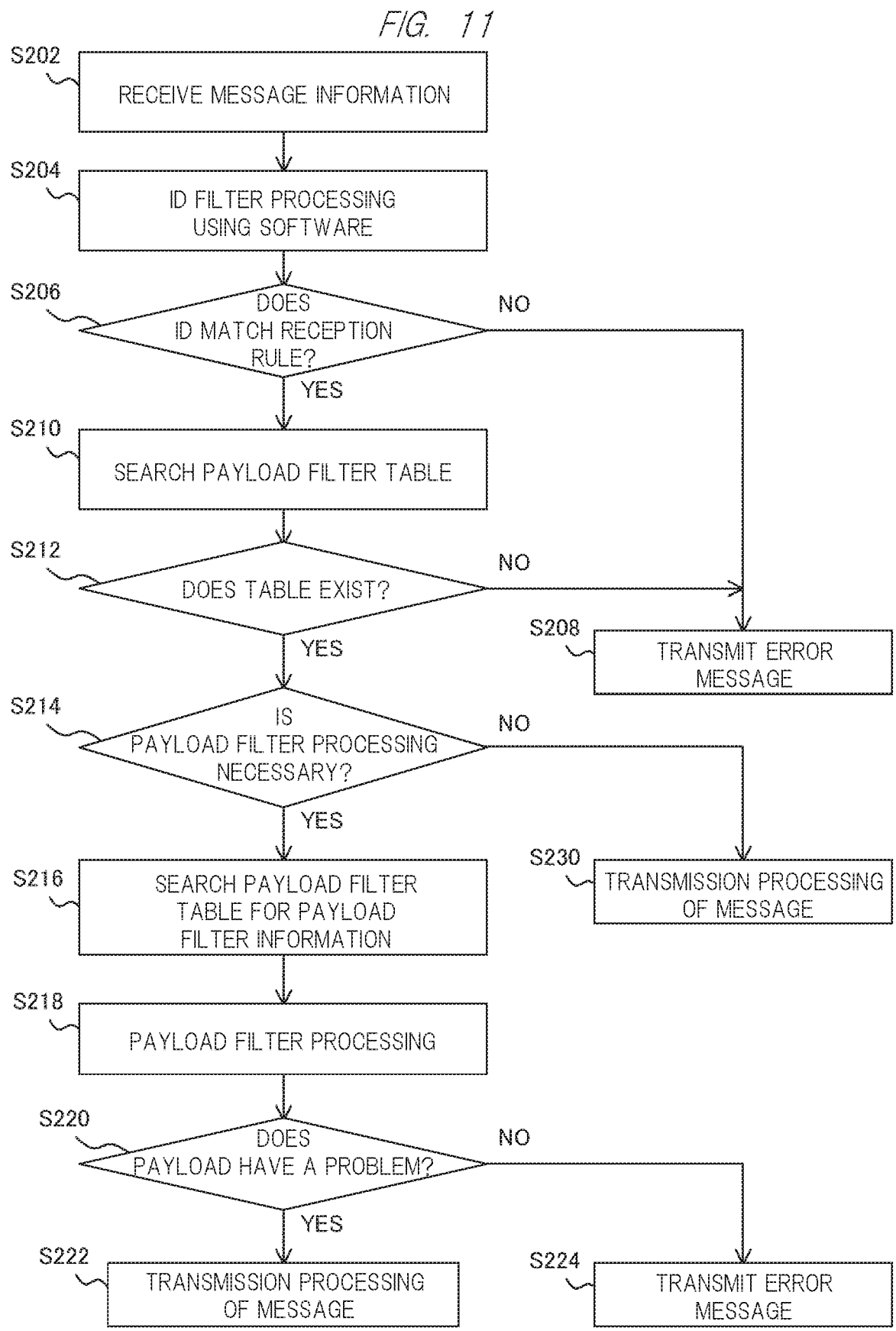
FIG. 11 is a diagram for explaining a second comparative example.

FIG. 11 is a diagram for explaining the second comparative example. FIG. 11 is a flowchart showing an information processing method (transfer processing method) according to the second comparative example. The second comparative example is an example in which all processes such as the filter processing and the payload filter processing based on the ID of the message information 50 are executed only by software without using the CAN controller 10.

When microcontroller 2 receives message information 50 (step S202), CAN controller 10 outputs a reception interrupt to the CPU 4. At this time, in step S204, the CAN routing software 100 performs an ID filter processing using the software. In this case, the CAN routing software 100 stores a table indicating which message IDs are appropriate and which message IDs are inappropriate. Therefore, in step S206, the CAN routing software 100 searches this table to determine whether the ID of the message information 50 matches the reception rule. If the ID does not match the reception rule (NO in S206), the CAN routing software 100 transmits an error message (step S208).

On the other hand, if the ID matches the reception rule (YES in S206), the CAN routing software 100 performs payload filter processing. Here, the CAN routing software 100 stores a payload filter table corresponding to FIG. 7. In the second comparative example, the reception rule label is not added to the message information 50. Therefore, in step S210, the CAN routing software 100 searches the payload filter table corresponding to the ID of the message information 50 as a process corresponding to step S128 of FIG. 9.

If the payload filter table does not exist (NO in step S212), the CAN routing software 100 transmits an error message (S208). On the other hand, when the payload filter table exists (YES in S212), the CAN routing software 100 determines whether or not the filter processing using the payload filter table is necessary as the process corresponding to S126 in FIG. 9 (step S214). When the filter processing using the payload filter table is not necessary (NO in S214), the CAN routing software 100 performs the transfer process of the message information 50 in the same manner as the process in S140 (step S230).

On the other hand, when the filter processing using the payload filter table is necessary (YES in S214), the CAN routing software 100 searches the payload filter table for the payload filter information as the process corresponding to the process in S130 (step S216). In step S218, the CAN routing software 100 performs payload filter processing in the same manner as in step S132 using the retrieved payload filter information. When there is no problem in the payload (YES in step S220), the CAN routing software 100 performs a transfer process of the message information 50 (step S222). On the other hand, when there is a problem in the payload (NO in S220), the CAN routing software 100 transmits an error message (step S224).

Here, in the second comparative example, it is necessary to perform the search processing in the processing of S210, S214, and S216. As the number of data to be searched increases, both the processing load and the processing speed tend to increase. Therefore, when the number of data to be searched increases due to the complexity of the in-vehicle network, the search processing according to the second comparative example takes a huge amount of time.

On the other hand, in the first embodiment described above, the CAN controller 10, which is hardware, is configured to add the reception rule label to the message information 50. Therefore, payload filter information can be obtained immediately by using the received rule label as an index. That is, in the first embodiment, it is unnecessary to perform the search processing in steps S210, S214, and S216. Therefore, in the first embodiment, the filter processing can be performed while suppressing an increase in the processing time. Especially, as the in-vehicle network becomes more complicated, the effect according to the first embodiment can be increased.

A Second Embodiment

Next, a second embodiment will be described. The second embodiment is different from the first embodiment in that the semiconductor device 1 (ECU) is connected to an in-vehicle network other than CAN. Other configurations of the second embodiment are substantially the same as those of the first embodiment.

Figure 12:
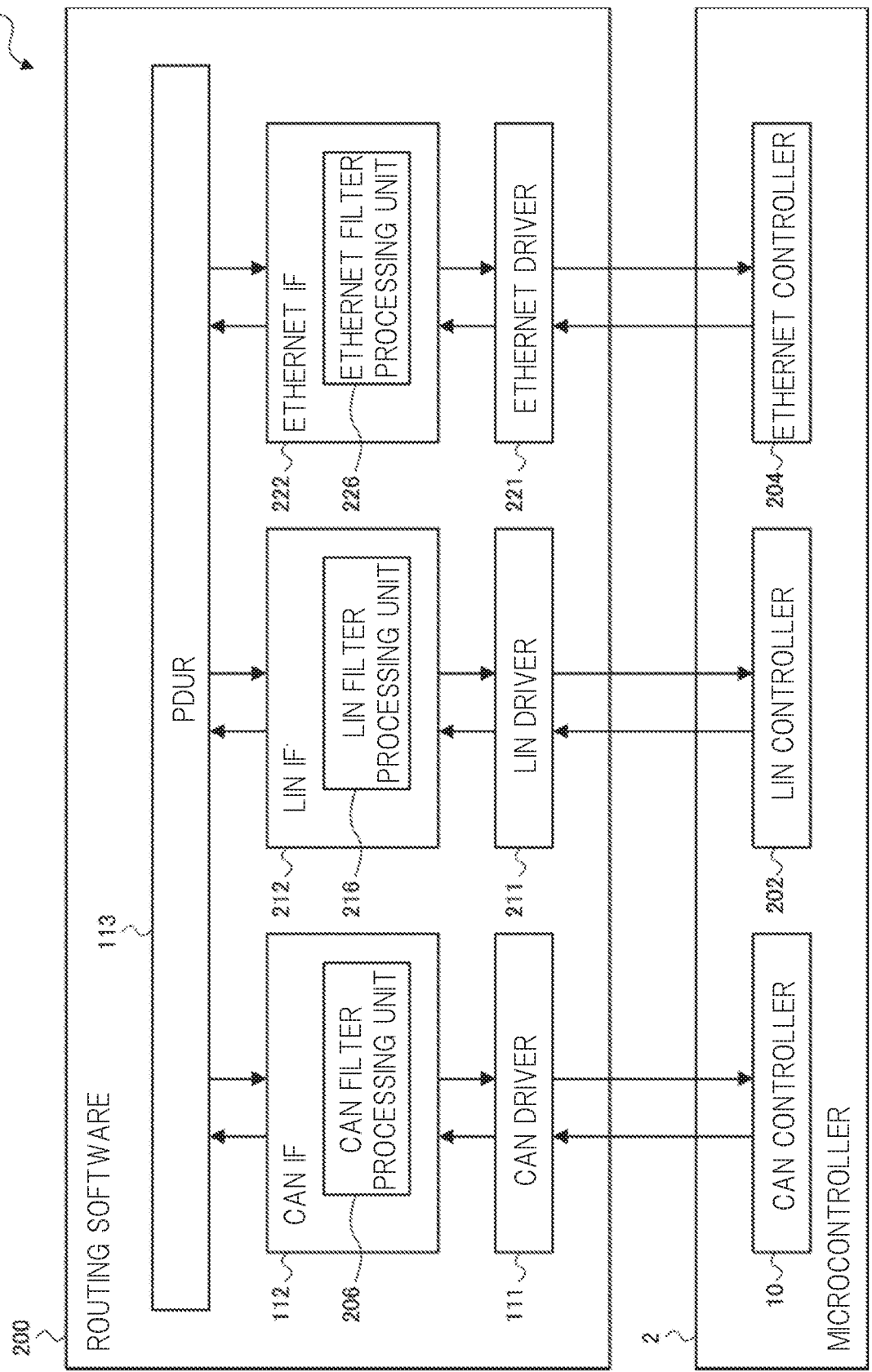
FIG. 12 is a diagram illustrating a configuration of a semiconductor device according to a second embodiment.

FIG. 12 is a diagram showing a configuration of the semiconductor device 1 according to the second embodiment. The semiconductor device 1 illustrated in FIG. 12 is connected to LIN (Local Interconnect Network) and Ethernet (Ethernet) (registered trademark) in addition to CAN. The semiconductor device 1 according to the second embodiment includes a microcontroller 2 and routing software 200. In addition to the CAN controller 10, the microcontroller 2 includes a LIN controller 202 and an Ethernet controller 204.

The LIN controller 202 is connected to the LIN. The LIN controller 202 has substantially the same functions as the CAN controller 10 with respect to the operation related to the LIN. The Ethernet controller 204 is connected to the Ethernet. The Ethernet controller 204 has substantially the same functions as the CAN controller 10 with respect to the operation related to Ethernet.

Like the CAN routing software 100, the routing software 200 according to the second embodiment includes a CAN driver 111, a CAN interface 112, and a PDU router 113. The routing software 200 according to the second embodiment further includes a LIN driver 211, a LIN interface 212 (LINIF), an Ethernet driver 221, and an Ethernet interface 222 (Ethernet IF). The PDU router 113 can handle only the content of the message information 50 by processing with the CAN interface 112, the LIN interface 212, and the Ethernet interface 222. That is, although the CAN interface 112, the LIN interface 212, and the Ethernet interface 222 handle message information that conforms to the CAN, LIN, and Ethernet protocols, respectively, the PDU router 113 can handle data that does not conform to these protocols.

The LIN driver 211 and the Ethernet driver 221 have substantially the same functions as those of the CAN driver 111 with respect to operations relating to LIN and Ethernet, respectively. The LIN interface 212 and the Ethernet interface 222 have substantially the same functions as the CAN interface 112 for LIN and Ethernet operations, respectively.

The CAN interface 112 includes a CAN filter processing unit 206 having substantially the same configuration as the filter processing unit 120 according to the first embodiment. The LIN interface 212 includes a LIN filter processing unit 216. The Ethernet interface 222 includes an Ethernet filter processing unit 226. The LIN filter processing unit 216 has an interface unit and an analyzing unit in the same manner as the CAN filter processing unit 206 (the filter processing unit 120), and performs substantially the same processing as the CAN filter processing unit 206 for processing relating to LIN. Similarly, the Ethernet filter processing unit 226 has an interface unit and an analyzing unit as in the case of the CAN filter processing unit 206 (filter processing unit 120), and performs substantially the same processing as the CAN filter processing unit 206 for processing related to Ethernet.

Like the CAN controller 10, the LIN controller 202 and the Ethernet controller 204 implement hardware routing functions. That is, the LIN controller 202 and the Ethernet controller 204 distribute the message information 50 using the reception rule table. Further, the LIN controller 202 and the Ethernet controller 204 add a reception rule label to the message information 50.

The LIN filter processing unit 216 and the Ethernet filter processing unit 226 perform a software-based filter processing similar to the CAN filter processing unit 206 (the filter processing unit 120). Specifically, the LIN filter processing unit 216 receives the message information 50 to which the reception rule label is added via the LIN driver 211. The interface unit of the LIN filter processing unit 216 extracts the reception rule label. Then, the analyzing unit of the LIN filter processing unit 216 performs filter processing using the payload filter table and the reception rule label. Thus, it is determined whether or not to transfer the message information 50 from the LIN. Similar processing is performed for the Ethernet filter processing unit 226, and it is determined whether or not to transfer the message information 50 from the Ethernet. In this manner, the semiconductor device 1 according to the second embodiment can realize substantially the same effects as those of the first embodiment described above not only for CAN but also for LIN and Ethernet.

The semiconductor device 1 according to the second embodiment can also perform routing across different networks, such as CAN to LIN and LIN to Ethernet. When routing is performed from CAN to LIN, the CAN controller 10 and the CAN filter processing unit 206 perform the above-described filter processing. When routing is performed from LIN to CAN, the LIN controller 202 and the LIN filter processing unit 216 perform the above-described filter processing.

In some cases, the maximum value of the message length that can be transferred is defined for each network. Therefore, when the maximum length of the message that can be transferred in the transfer destination network is smaller than the maximum length of the message that can be transferred in the transfer source network, the filtering unit for the transfer source network can divide and transmit the message according to the maximum length of the message in the transfer destination network. For example, in Ethernet, the maximum value may be defined as 1000 bytes, whereas in CAN, the maximum value may be defined as 64 bytes. In this case, when the message information is transferred from the Ethernet to the CAN, the Ethernet filter processing unit 226 divides the message so that the data length becomes 64 bytes at the maximum.

As described above, the semiconductor device 1 according to the second embodiment can realize substantially the same effects as those of the first embodiment described above not only for CAN but also for LIN and Ethernet. Further, even when message information is transferred between different networks, the semiconductor device 1 according to the second embodiment does not need to perform the filter processing in the application layer 105, as in the first embodiment. Therefore, in the second embodiment, even when message information is transferred between different networks, routing can be performed at high speed. In other words, even when message information is transferred between different networks, filtering can be performed while suppressing an increase in processing time.

The present embodiment is not limited to the above embodiment, and can be modified as appropriate without departing from the spirit. For example, in the flowchart according to the above embodiment, the order of each process can be changed as appropriate. For example, in FIG. 9, the process of S126 may be performed after the process of S128 or after the process of S130.

Part of the processing performed by the constituent elements described in the above embodiment may be performed by another constituent element. For example, the process of S128 in FIG. 9 may be performed by the interface unit 122 instead of the analyzing unit 130. The processing of the error message transmitting unit 136 and the message forwarding unit 138 may be performed by the payload filter processing unit 134.

Further, the processing shown in FIG. 8 may be performed by the CAN routing software 100 instead of the CAN controller 10. However, as described above with reference to FIG. 11, the processing shown in FIG. 8 is performed by the CAN controller 10, which is hardware, so that the filter processing can be performed while further suppressing an increase in processing time.

Also, the programs described above may be stored and provided to a computer using various types of non-transitory computer readable media. Non-transitory computer readable media includes various types of tangible storage media. Examples of non-transitory computer readable media include magnetic recording media (e.g., flexible disks, magnetic tapes, hard disk drives), magneto-optical recording media (e.g., magneto-optical disks), CD-ROM (Read Only Memory) CD-R, CD-R/W, semiconductor memories (e.g., masked ROM, PROM (Programmable ROM), EPROM (Erasable PROM), flash ROM, RAM (Random Access Memory). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Some or all of the above embodiments may also be described as the following appendix, but are not limited to the following. (Appendix 1) A program for causing a computer to execute comprising: an extracting step that extracts additional information added to message information received from an in-vehicle network, and a performing step that performs a filter processing for determining whether or not to route the message information using the additional information. (Appendix 2) The program according to Appendix 1, wherein the performing step that performs the filter processing uses payload filter information acquired with using the additional information to filter the payload of the message information. (Appendix 3) The program according to Appendix 2, wherein the performing step that performs the filter processing uses a payload filter table associated with at least a portion of the additional information to perform the filter processing for the payload. (Appendix 4) The program according to Appendix 3, wherein the performing step that performs the filter processing uses payload filter information associated with at least a portion of the additional information in the payload filter table to filter the payload.

Although the invention made by the inventor has been specifically described based on the embodiment, the present invention is not limited to the embodiment already described, and it is needless to say that various modifications can be made without departing from the gist thereof.

What is claimed is:

1. A semiconductor device comprising:
a controller configured to receive message information through a bus, perform a first filter processing on the received message information using an identifier of the received message information to determine whether to route the received message information, and add additional information corresponding to a result of the first filter processing to the received message information;
a storage circuit for storing software;
at least one processing circuit for executing the software; and
a payload filter table having a plurality of payload filter information,
wherein the software, when executed by the at least one processing circuit, causes the at least one processing circuit to perform a filtering function for performing a second filter processing on a payload of the message information output from the controller using the additional information added to the message information to determine whether the payload of the message information output from the controller is normal and to perform a routing processing for transferring the message information which is determined by the second filter processing that the payload of the message information is normal to the bus,
wherein the additional information is an index for obtaining the payload filter information from the payload filter table, and
wherein the second filter processing on the payload is performed according to payload filter information obtained based on the additional information.

2. The semiconductor device according to claim 1, wherein the filtering function of the software performs a transfer processing of the message information without performing the filter processing using the payload filter information when at least a part of the additional information matches predetermined data.

3. The semiconductor device according to claim 1, wherein the controller distributes the message information according to a predetermined reception rule.

4. The semiconductor device according to claim 3, wherein the controller performs the first filter processing on an identifier of the message information with using a reception rule table indicating the reception rule.

5. The semiconductor device according to claim 4, wherein the controller adds the additional information using the reception rule table.

6. The semiconductor device according to claim 3,
wherein the controller stores the message information that matches the reception rule in at least a first buffer capable of transmitting data, and
wherein the filtering function of the software performs filtering on a payload of the message information stored in the first buffer.

7. The semiconductor device according to claim 3,
wherein the controller stores the message information that does not conform to the reception rule in a second buffer capable of only receiving data, and
wherein the filtering function of the software transmits an error message with respect to the message information stored in the second buffer without performing filtering by the software.

8. The semiconductor device according to claim 1, wherein the filtering function performs filtering in a layer that abstracts hardware components of the semiconductor device.

9. A semiconductor device comprising:
a controller configured to receive message information through a bus, perform a first filter processing on an identifier of the received message information to determine whether to route the received message information, and add additional information based on a result of the first filter processing to the received message information;
a storage circuit for storing software;
at least one processing circuit for executing the software; and
a payload filter table having a plurality of payload filter information,
wherein the software, when executed by the at least one processing circuit, causes the at least one processing circuit to perform functions including:
an application for executing processing independent of a microcontroller configuring the semiconductor device; and
basic software for making the application independent of the microcontroller, and
wherein the basic software implements a filtering function for performing a second filter processing for determining whether a payload of the message information output from the controller is normal using the additional information and the payload of the message information in a network interface for enabling use of a protocol defining the bus provided in a layer for abstracting hardware of the semiconductor device and a routing function for performing a routing processing for transferring the message information which is determined that the payload of the message information is normal to the bus,
wherein the additional information is an index for obtaining the payload filter information from the payload filter table, and
wherein the second filter processing on the payload is performed according to payload filter information obtained based on the additional information.

10. An information processing method comprising:
performing a first filter processing on an identifier of message information received through a bus to determine whether to route the received message information;
adding additional information to the received message information;
performing a second filter processing for determining whether a payload of the received message information is normal using payload filter information searched from a payload filter table by the additional information; and
performing a routing processing for transferring the message information which is determined that the payload of the message information is normal to the bus,
wherein the additional information is an index for obtaining the payload filter information from the payload filter table, and
wherein the second filter processing on the payload is performed according to payload filter information obtained based on the additional information.

11. The information processing method according to claim 10, wherein the message information is distributed according to a predetermined reception rule.

12. The information processing method according to claim 11, wherein filtering is performed on an identifier of the message information with using a reception rule table indicating the reception rule.

13. The information processing method according to claim 11, wherein the addition of the additional information and the distribution of the message information are realized by hardware, and the second filter processing using the additional information is realized by software.

* * * * *